United States Patent [19]

Schenk, Jr. et al.

[11] Patent Number: 4,553,095
[45] Date of Patent: Nov. 12, 1985

[54] EDDY CURRENT THICKNESS GAUGE WITH CONSTANT MAGNETIC BIAS

[75] Inventors: Harold L. Schenk, Jr.; Warren R. Junker, both of Monroeville, Pa.

[73] Assignee: Westinghouse Electric Corp., Pittsburgh, Pa.

[21] Appl. No.: 387,051

[22] Filed: Jun. 10, 1982

[51] Int. Cl.$^4$ .......................... G01B 7/10; G01R 33/12
[52] U.S. Cl. ..................................................... 324/230
[58] Field of Search ............................... 324/229–231, 324/228, 234, 236, 239, 262

[56] References Cited

U.S. PATENT DOCUMENTS

| | | | |
|---|---|---|---|
| 2,226,275 | 12/1940 | Abbott et al. | 324/229 |
| 2,933,677 | 4/1960 | Lieber | 324/230 |
| 3,405,353 | 10/1968 | Smith et al. | 324/229 |
| 3,611,119 | 10/1971 | Madewell et al. | 324/234 |
| 3,659,195 | 4/1972 | Blacherby | 324/234 |
| 3,761,804 | 9/1973 | Stiengrover | 324/230 |
| 3,922,599 | 11/1975 | Stiengrover et al. | 324/230 |
| 3,986,105 | 12/1976 | Nix et al. | 324/230 |

FOREIGN PATENT DOCUMENTS

| | | |
|---|---|---|
| 544498 | 4/1942 | United Kingdom . |
| 810423 | 3/1959 | United Kingdom . |
| 840112 | 7/1960 | United Kingdom . |
| 1061895 | 3/1967 | United Kingdom . |
| 1097179 | 12/1967 | United Kingdom . |
| 1410301 | 10/1975 | United Kingdom . |

*Primary Examiner*—Gerard R. Strecker
*Assistant Examiner*—Walter E. Snow
*Attorney, Agent, or Firm*—R. P. Lenart

[57] ABSTRACT

An eddy current thickness probe for measuring the thickness of a weakly ferromagnetic material layer on a ferromagnetic base is provided with an essentially constant magnetic field bias. The magnetic field bias is of sufficient strength to substantially saturate ferromagnetic constituents in the weakly ferromagnetic layer. This eliminates any effects of changes in permeability of the weakly ferromagnetic layer which would otherwise impair the operation of an eddy current thickness gauge.

13 Claims, 2 Drawing Figures

EDDY CURRENT THICKNESS GAUGE WITH CONSTANT MAGNETIC BIAS

BACKGROUND AND SUMMARY OF THE INVENTION

This invention relates to electromagnetic thickness gauges and more particularly to such gauges which are used to measure the thickness of a weakly ferromagnetic layer deposited on a ferromagnetic base material.

In certain manufacturing processes, a layer of one material is deposited on a different base material. To control these processes and inspect the product, a simple non-destructive method for determining the thickness of the material layer is desirable. If the cladding in the inspected region is found to be less than a specified thickness, then additional material can be added to the layer. For non-magnetic cladding materials such as Inconel 600 and 304 stainless steel on a ferromagnetic base material, the clad thickness can be determined using known techniques and equipment such as low frequency eddy current probes or magnetic force probes.

In the manufacture of certain components for use in the nuclear industry, a layer of austenitic stainless steel is deposited on a steel base. The non-magnetic austenitic stainless steel matrix contains a certain amount of δ-ferrite which is added to prevent cracking of the layer. The δ-ferrite is a magnetic constituent which has a major influence on characteristics of the austenitic stainless steel layer such as intensity of magnetization and permeability. Therefore the presence of δ-ferrite in an austenitic stainless steel layer adversely affects the performance of standard eddy current probes or magnetic force probes.

Since eddy current probe signals are affected by the clad material permeability as well as the clad thickness, a direct clad thickness measurement can only be made if the effect of the clad material permeability is eliminated or at least reduced so that its influence is minimal. For an austenitic stainless steel layer having a δ-ferrite constituent, minimizing the permeability effects can be accomplished by magnetically saturating the δ-ferrite. In this invention, saturation of the δ-ferrite is accomplished through the use of an essentially constant magnetic bias in the probe.

A probe for an eddy current thickness gauge for measuring the thickness of a weakly ferromagnetic layer on a ferromagnetic base in accordance with the present invention includes a measuring coil having an electrical characteristic which varies as a function of the magnetic conductivity of the layer and base, and means for producing an essentially constant magnetic field of sufficient strength to substantially saturate the ferromagnetic constituent of the layer being measured. A gauge in which this probe would be used further includes a means for energizing the coil with an alternating signal and means for measuring changes in the electrical characteristic of the measuring coil when the measuring coil is energized. The use of such a gauge is in accordance with a method for measuring the thickness of a weakly ferromagnetic layer on a ferromagnetic base wherein the method includes the steps of: placing a measuring coil adjacent the weakly ferromagnetic layer; applying a constant magnetic field to the weakly ferromagnetic layer to substantially saturate the magnetic constituents of the layer; applying an alternating signal to the measuring coil; and measuring an electrical characteristic of th measuring coil wherein the electrical characteristic varies in response to the thickness of the weakly ferromagnetic layer.

DESCRIPTION OF THE PREFERRED EMBODIMENT

Figure 1:
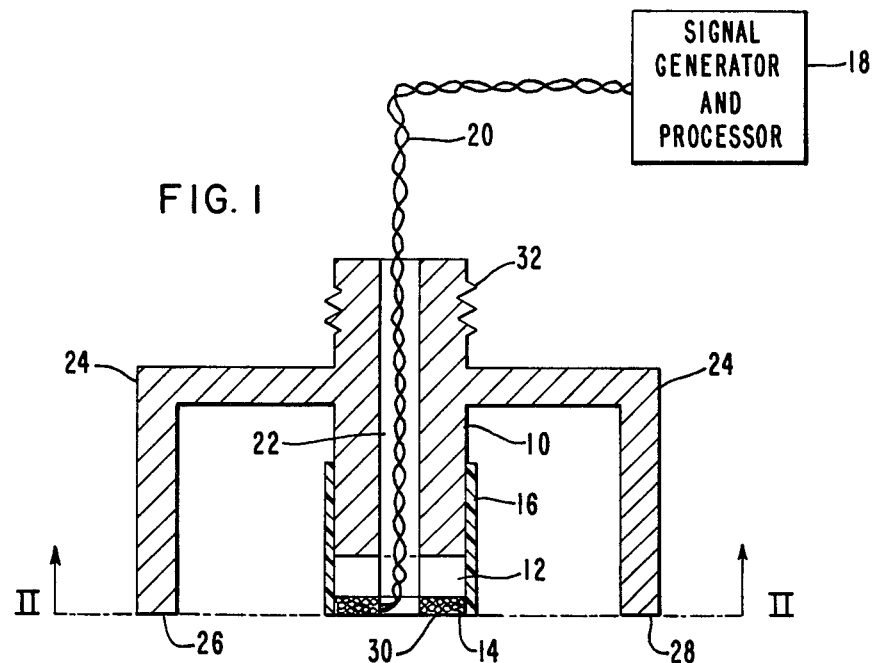
FIG. 1 is a cross-sectional view of an eddy current thickness probe having a constant magnetic bias as a component of a gauge in accordance with one embodiment of the present invention.

FIG. 1 shows a cross-sectional view of an eddy current thickness probe for use in a thickness gauge in accordance with one embodiment of the present invention. The main probe leg 10 is made of a high permeability material such as soft iron. Permanent magnet 12 located near the end of main probe leg 10 provides a means for generating a constant magnetic field bias. Eddy current coil 14 is held in close proximity to permanent magnet 12 within an insulating sleeve 16. Signal generator and processor 18 includes a means for supplying an alternating current signal by way of cable 20 to eddy current coil 14 and also includes means for measuring a change in the electrical characteristics of eddy current coil 14. Cable 20 passes through a central hole 22 in probe leg 10 and permanent magnet 12. Yoke 24 includes two legs which extend from main probe leg 10 and are machined such that their end faces 26 and 28 are parallel and flush with the end surface 30 of eddy current coil 14. The yoke, although not requisite, is made of low reluctance material such as soft iron and reduces the magnetomotive force drop in the air flux path thus obtaining a higher flux density in the cladding being measured. Main probe leg 10 includes a threaded portion 32 to allow for the attachment of an electrical connector.

For cladding thicknesses of austenitic stainless steel in the range of 50 to 250 mils and having a δ-ferrite constituent of up to 25 percent, a constant biasing field of approximately 8 to 10 kilogauss is required to reduce the permeability effects of the cladding to a satisfactory level for direct clad thickness measurements. Constant bias field strength must be chosen to sufficiently saturate the cladding without saturating the ferromagnetic base material or the probe leg and yoke. The eddy current coil in this embodiment is an air core coil having a thickness of approximately 1/16 inch and comprising 425 turns of No. 40 magnet wire having a DC resistance of approximately 70 ohms and an inductance of approximately 2 millihenries. The use of such an air core eddy current coil avoids the losses and thermal effects of a soft iron pot core coil and avoids the core saturation which was found to occur in ferrite pot core coils.

Figure 2:
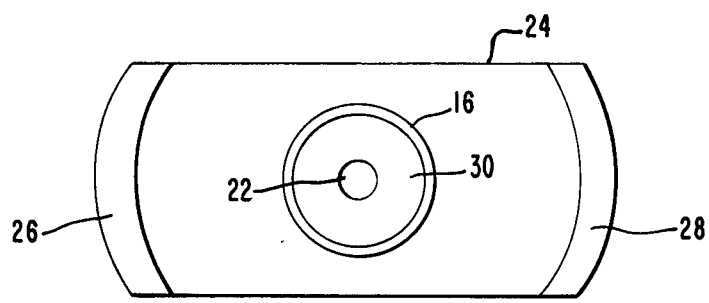
FIG. 2 is an end view of the probe of the gauge of FIG. 1.

FIG. 2 shows an end view of the probe of FIG. 1 as seen along line II—II of FIG. 1. Machined faces 26 and 28 of yoke 24 are shown to be curved to provide for a more uniform flux concentration in the layer being measured. Although yoke 24 is not required for operation of the probe, its use improves probe performance.

The permanent magnet eddy current probe of FIG. 1 has been used in conjunction with an Automation Industries, Inc. model EM-3300 eddy current instrument as the signal generator and processor 18, to determine the thickness of nine austenitic stainless steel weld overlay specimens having varying ferrite contents. Reference step-blocks were machined from each of the nine samples having step thickness of 0.100, 0.125, 0.150 and 0.175 inches. A frequency of 2 kilohertz was used and the EM-3300 was balanced with the probes at this frequency by adjusting the resultant bridge output signal displayed on the EM-3300 oscilloscope. The EM-3300 display comprises an oscilloscope trace having a displacement proportional to the eddy current coil impedance and therefore proportional to the layer thickness. Measurements were made of the resultant displacements obtained from photographs of the lift-off displays produced as the eddy current probe was set upon each of the nine stainless steel samples which were placed on a smooth flat steel plate. Sample No. 3 was arbitrarily chosen as the reference and used to obtain a curve of clad thickness versus relative displacement. The step thicknesses of the other eight samples were then determined from this curve.

Table I lists the measured step thicknesses of the other eight clad specimens.

TABLE I

CLAD SPECIMEN STEP THICKNESS DETERMINED USING CONSTANT MAGNETIC BIAS EDDY CURRENT PROBE

| SAMPLE NUMBER | STEP THICKNESS | | | |
|---|---|---|---|---|
| | 0.100" | 0.125" | 0.150" | 0.175" |
| 1 | 0.096 | 0.117 | 0.141 | 0.167 |
| 2 | 0.098 | 0.120 | 0.154 | 0.175 |
| 3 | Reference | | | |
| 4 | 0.098 | 0.120 | 0.145 | 0.167 |
| 5 | 0.098 | 0.120 | 0.154 | 0.175 |
| 6 | 0.107 | 0.130 | 0.154 | 0.175 |
| 7 | 0.103 | 0.127 | 0.159 | 0.180 |
| 8 | 0.100 | 0.127 | 0.154 | 0.180 |
| 9 | 0.103 | 0.130 | 0.159 | 0.180 |

The maximum error for the determination of the step thicknesses is ±7 percent. For a constant magnetic bias eddy current probe similar to that shown in FIG. 1 but without yoke 24, the step thicknesses where determined with a maximum error of ±10 percent. In each case, the permanent magnet was samarium cobalt ($SmCo_5$) which generated sufficient flux to saturate the δ-ferrite in the layer whose thickness was being determined.

The non-destructive test eddy current thickness probe with essentially constant magnetic bias described by the present invention can be used to determine the clad thickness of austenitic stainless steel or other material having a ferromagnetic constituent of up to 25 percent and a thickness of about 50 to 250 mils. In practice, the maximum layer thickness which can be measured is limited by the size of the probe magnet while the minimum layer thickness is limited by the measuring frequency. The probe can be used on welded cladding or on curved surfaces as well although special thickness standards having the appropriate curvature would be required for surfaces with radii less than about one foot.

The method of using the eddy current thickness gauge with constant magnetic bias as shown in FIG. 1, to measure the thickness of a weakly ferromagnetic layer on a ferromagnetic base, includes the steps of: placing a measuring coil adjacent the weakly ferromagnetic layer; applying a constant magnetic field to the weakly ferromagnetic layer with the field having sufficient strength to substantially saturate the magnetic constituents of the layer; applying an alternating signal to the measuring coil; and measuring an electrical characteristic such as the impedance of the coil, wherein the electrical characteristic varies in response to the thickness of the weakly ferromagnetic material.

What is claimed is:

1. A probe for measuring the thickness of a layer containing small quantities of ferromagnetic material clad on a ferromagnetic base, said probe comprising:
   an air core measuring coil;
   said measuring coil having an electrical characteristic being variable as a function of the magnetic conductivity of said base; and
   means for producing a constant magnetic field, said magnetic field being of sufficient strength to substantially magnetically saturate said small quantities of ferromagnetic material in a layer being measured, thereby substantially eliminating any influence of the magnetic conductivity of said layer on said electrical characteristic of said measuring coil, and said magnetic field being of insufficient strength to magnetically saturate said base;
   wherein said measuring coil is disposed between said layer and said means for producing a constant magnetic field.

2. A probe for measuring thickness as recited in claim 1, further comprising:
   means for energizing said coil with an alternating electrical signal; and
   means for measuring changes in said electrical characteristic of said measuring coil while said measuring coil is energized.

3. A probe for measuring thickness as recited in claim 1, further comprising:
   a yoke of low reluctance material disposed around said means for producing a constant magnetic field;
   said yoke having two faces adjacent the surface of said layer being measured, said faces being on opposite sides of said means for producing a constant magnetic field, thereby concentrating said constant magnetic field in a portion of said layer between said faces.

4. A probe for measuring thickness as recited in claim 1, wherein said means for producing a constant magnetic field comprises:
   a permanent magnet.

5. A probe for measuring thickness as recited in claim 4, wherein said permanent magnet is comprised of samarium cobalt.

6. A probe for measuring thickness as recited in claim 1, wherein said constant magnetic field is at least 8 kilogauss.

7. A probe for measuring thickness as recited in claim 1, wherein said measuring coil is a pancake coil comprising approximately 425 turns of No. 40 magnet wire and having a DC resistance of approximately 70 ohms and an inductance of approximately 2 millihenries.

8. A probe for measuring thickness as recited in claim 1, further comprising an insulating sleeve, said measuring coil and said means for producing a constant magnetic field being disposed within said sleeve.

9. A probe for measuring thickness as recited in claim 1, wherein said constant magnetic field is of sufficient strength to substantially saturate said layer containing up to 25 percent δ-ferrite in a non-magnetic matrix.

10. A probe for measuring thickness as recited in claim 9, wherein said layer is 50 to 250 mils thick.

11. A probe for measuring thickness as recited in claim 10, wherein said non-magnetic matrix is austenitic stainless steel.

12. A probe for measuring thickness as recited in claim 1, further comprising:
   means for producing a signal proportional to the thickness of said layer in response to said electrical characteristic of said measuring coil.

13. A method of measuring the thickness of a weakly ferromagnetic layer on a ferromagnetic base, said method comprising the steps of:
   placing an air core measuring coil adjacent to said weakly ferromagnetic layer;
   applying a constant magnetic field to said weakly ferromagnetic layer, said constant magnetic field having sufficient strength to substantially saturate the magnetic constituents of said weakly ferromagnetic layer and having insufficient strength to saturate said ferromagnetic base;
   applying an alternating signal to said measuring coil; and
   measuring an electrical characteristic of said coil, wherein said electrical characteristic varies in response to the thickness of said weakly ferromagnetic layer, wherein any influence of the magnetic constituents of said weakly ferromagnetic layer on the electrical characteristic of said coil has been substantially eliminated by the substantial saturation of said magnetic constituents.

* * * * *